UNITED STATES PATENT OFFICE.

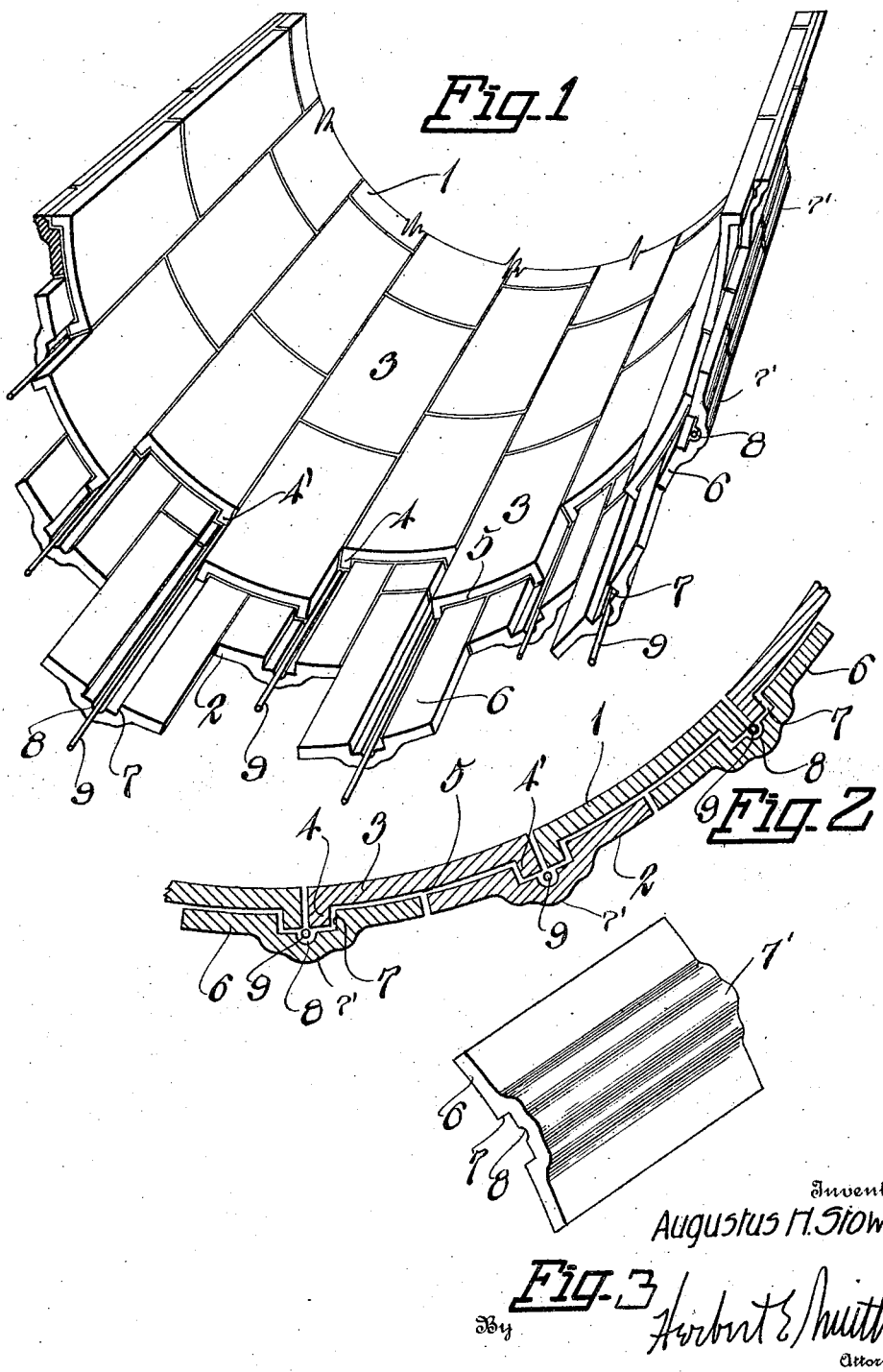

AUGUSTUS H. STOWELL, OF SPOKANE, WASHINGTON.

FLUME CONSTRUCTION.

1,415,274.  Specification of Letters Patent.  Patented May 9, 1922.

Application filed June 7, 1920. Serial No. 386,989.

*To all whom it may concern:*

Be it known that I, AUGUSTUS H. STOWELL, a citizen of the United States, residing at Spokane, in Spokane County and State of Washington, have invented certain new and useful Improvements in Flume Constructions, of which the following is a specification.

My present invention relates to an improved flume construction adapted especially for use in irrigation flumes, ditches, &c., and for sewers, and other conduits for conveying water and other liquids, the primary object of the invention being the provision of a tile construction to form flumes, conduits or sewers and similar structures that may be built with facility and convenience; that are strong and self-sustaining as to their walls, and which present smooth interior surfaces for the passage of the liquid to be conveyed. By the utilization of my invention I am enabled to manufacture and produce the tiles forming the walls of the structure at comparatively inexpensive first cost, in such manner as to permit convenient storing and shipping of the tiles and to provide simple but effective means of interlocking the tiles of the inner and outer walls of the structure.

To attain these results the invention consists in novel means employed in the manufacture of the tiles and of building the walls of the flume structure so that they are combined and arranged as hereinafter described, illustrated in the accompanying drawings and set forth in the appended claims, it being understood that various changes may be made within the scope of my claims without departing from the spirit of my invention.

In the accompanying drawings I have illustrated one complete example of the physical embodiment of my invention in which the parts are constructed and combined according to the best mode I have so far devised for the practical application of the principles of my invention.

Figure 1 is a perspective view showing a portion of an irrigation flume constructed according to my invention.

Figure 2 is a transverse sectional view through the inner and outer walls of the structure, the parts being enlarged.

Figure 3 is a perspective view illustrating a tile for the outer wall of the flume.

In the preferred form of the invention as illustrated in the drawings in Figure 1 I have shown a portion of an irrigation flume fashioned with an inner wall and an outer wall indicated respectively as 1 and 2. The inner wall is made up of tiles 3 having a curve in their structure to conform to the circumference of the circular wall of the flume, and along the outer edges of this tile extend the longitudinal flanges 4 and 4', of course integral with the body of the tile, and providing an outer, wide groove 5 extending the length of the outer face of the tile.

The tiles 6, forming the outer wall or tier of the flume are also curved to conform to the circular construction of the outer wall of the flume, and this tile is fashioned with a longitudinally extending, central groove 7, the full length of the tile and of sufficient width and depth to accommodate pairs of adjoining flanges 4 4' of the tile 3 of the inner wall or lining of the flume, and to provide an exterior, longitudinally extending depression or rib, corrugated and rounded as shown at 7', on the tile. The grooves 7 are fashioned with a countersunk recess 8 curved in cross section as shown to receive the reinforcing rods or metal bars 9, about which the cement is poured to embed the rod for reinforcing the wall. The central exterior rib 7' with its corrugations is adapted to make close binding with the surrounding earth in which the wall is embedded, and these continuous exterior longitudinally extending ribs formed in parallelism in the outer face of the wall of the flume materially assist in supporting the wall as well as prevent lateral movement of the earth beneath the wall and adjacent thereto.

In laying the tiles the longitudinal joints are staggered as shown, and as the inner tiles overlap the outer tiles their joints are broken, thus not only are the end joints of the inner tiles staggered, but the end joints of the outer tiles are also staggered, and the lateral joints of both inner and outer walls are overlapped. The filling of cement at all joints and about the reinforcing rods and flanges in the grooves and recesses renders the structure a strong and homogeneous wall of double thickness, that is able to withstand pressure and be self-sustaining at points where the earth has settled by forming a substantial bridge structure for the unsupported portion of the flume.

Having thus fully described my invention, what I claim as new and desire to secure by Letters Patent is—

1. A tile for double wall construction having a groove centrally of the inner face adapted to receive portions of the inner tiles of said wall, said groove having a recess extending longitudinally thereof adapted to receive a reinforcing rod, and said tile having longitudinally extending central ribs on its exterior surface.

2. A tile for double wall construction having a groove centrally of its inner face adapted to receive portions of the inner tiles of said wall, and said tile having its outer face formed with a central longitudinally extending rib and a similar rib at each side of said central rib to prevent lateral displacement of said tile.

In testimony whereof I affix my signature.

AUGUSTUS H. STOWELL.